W. F. SIMMONS.
COMBINED CAN OPENER, COVER, AND DISPENSER.
APPLICATION FILED JULY 19, 1919.
1,348,519.
Patented Aug. 3, 1920.
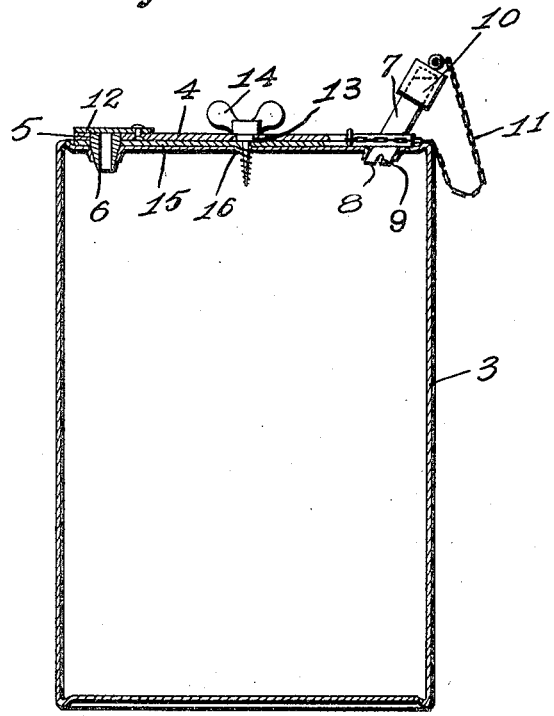
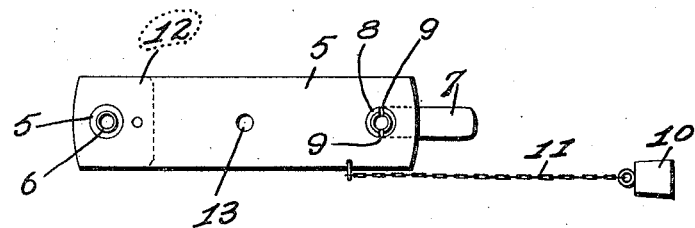
Inventor
William F. Simmons
by Edward E. Longan
Atty.

UNITED STATES PATENT OFFICE.

WILLIAM F. SIMMONS, OF ST. LOUIS, MISSOURI.

COMBINED CAN-OPENER, COVER, AND DISPENSER.

1,348,519.  Specification of Letters Patent.  Patented Aug. 3, 1920.

Application filed July 19, 1919. Serial No. 312,099.

*To all whom it may concern:*

Be it known that I, WILLIAM F. SIMMONS, a citizen of the United States, and resident of the city of St. Louis and State of Missouri, have invented certain new and useful Improvements in Combined Can-Openers, Covers, and Dispensers, of which the following is a specification, containing a full, clear, and exact description, reference being had to the accompanying drawings, forming a part hereof.

My invention relates to improvements in combined can opener, cover and dispenser and has for its primary object an improved device for opening and dispensing the contents of canned goods such as condensed milk and the like, the device being so constructed that after the can has been opened the same may be maintained in an air tight condition thus preventing coagulation of the condensed milk as well as to prevent the admission of any foreign substance into the milk can.

In the drawings:

Figure 1 is a longitudinal section through the can and my improved device when applied for use.

Fig. 2 is a bottom plan view of the device removed from the can and also retaining screw removed.

Referring to the drawings, 3 indicates a condensed milk can of the ordinary construction.

My improved device comprises a plate 4 in one end of which is located a tubular punching member 5 having its edge sharpened as at 6. This tubular punching member may be screw seated in the plate 4 or welded therein as desired.

Located in the opposite end of the plate is a pouring spout 7 which is also provided with a sharpened edge 8. The spout 7 projects through the plate as illustrated in Fig. 1 and is welded to the plate and also has its lower or inwardly projecting end slitted as at 9.

Mounted on the pouring spout 7 is a cap 10 which is secured to the plate 4 by means of a flexible connection 11.

12 indicates a pivoted plate which is adapted to cover the punching member 5 forming as it were a driving head in the position illustrated in Fig. 1. When it is desired to use the punching member 5 as a vent opening, the plate 12 is swung around.

Formed centrally of the ends of the plate 4 is an opening 13 in which a thumb screw 14 may be inserted. Mounted on the bottom of the plate 4 and over the punching member 5 and the inwardly projecting end of the member 7 is a gasket 15. This gasket is also provided with an opening through which the thumb screw 14 may be inserted.

When it is desired to apply my device to a condensed milk can or the like, a hole is formed in the top of the can by means of the tubular punching member 5. The projecting end of the pouring member is inserted in said opening and then another opening is formed by driving in the punching member 5 in the top of the can, and in these openings so formed both the punching member 5 and the projecting end of the member 7 are seated.

In order to retain the device in a fixed position on the milk can, I form a small hole 16 in the top of the milk can, by means of a nail, ice-pick or any other pointed instrument, and also through the gasket 15 for the reception of the thumb screw 14. The thumb screw 14 is of the wood screw type and by screwing the same through the small opening formed in the milk can top, my device may be firmly secured in position.

The gasket 15 forms an air tight connection preventing any foreign substances from finding access to the can and also prevents the milk from coagulating.

In the operation of discharging the contents of the can the cap 10 is removed and the plate 12 is swung around on its pivotal connection so that the tubular punching member 5 may be used as a vent opening. By means of the slits or notches 9, the entire contents of the can may be emptied.

The device is made out of non-corrosive material and by means of the thumb screw 14, it may be firmly applied to the milk can without any danger of being dislocated when the device is in use.

I have found out by experiment that my previous device, as set forth in an application filed by me on Jan. 29, 1919, was impractical for the reason that when in use the device became dislocated.

If desired, after the device has been applied to the milk can by means of the thumb screw 14, holes may be formed in the can by means of an ice pick or other suitable instrument to receive the punching member 5 and the projecting end of the member 7. In other words, the projecting member 5 may be dispensed with and holes formed in the milk can by means of any suitable instrument in which case the punching member 5 need not be made so long and the punching end of the member 7 shortened.

Having fully described my invention, what I claim is:

A combined can opener, cover and dispenser comprising a plate, a tubular member provided with a cutting edge secured to one end of said plate and answering as a punch for perforating the end of a can and also as a vent for dispensing the contents thereof, a cover plate pivotally secured to the plate and adapted to open and close said tubular member, a straight and inclined tubular pouring member, mounted in the opposite end of said plate and having its lower end slitted, a cap adapted to be mounted on the end of the said pouring member, a flexible connection between said cap and plate, a gasket mounted on said tubular members, and a thumb screw mounted in the plate between said tubular members and adapted to be screw seated in an opening formed through the end of the can for securing the device to the can.

In testimony whereof, I have signed my name to this specification, in presence of two subscribing witnesses.

WILLIAM F. SIMMONS.

Witnesses:
 EDWARD E. LONGAN,
 CLAUD D. HALL.